Oct. 18, 1932.  F. H. RAGAN  1,883,317
BRAKE OPERATING MECHANISM
Filed June 25, 1928   2 Sheets-Sheet 1

Inventor
Frederick H. Ragan.
By Cameron, Kerkam and Sutton.
Attorneys

Oct. 18, 1932.  F. H. RAGAN  1,883,317
BRAKE OPERATING MECHANISM
Filed June 25, 1928   2 Sheets-Sheet 2
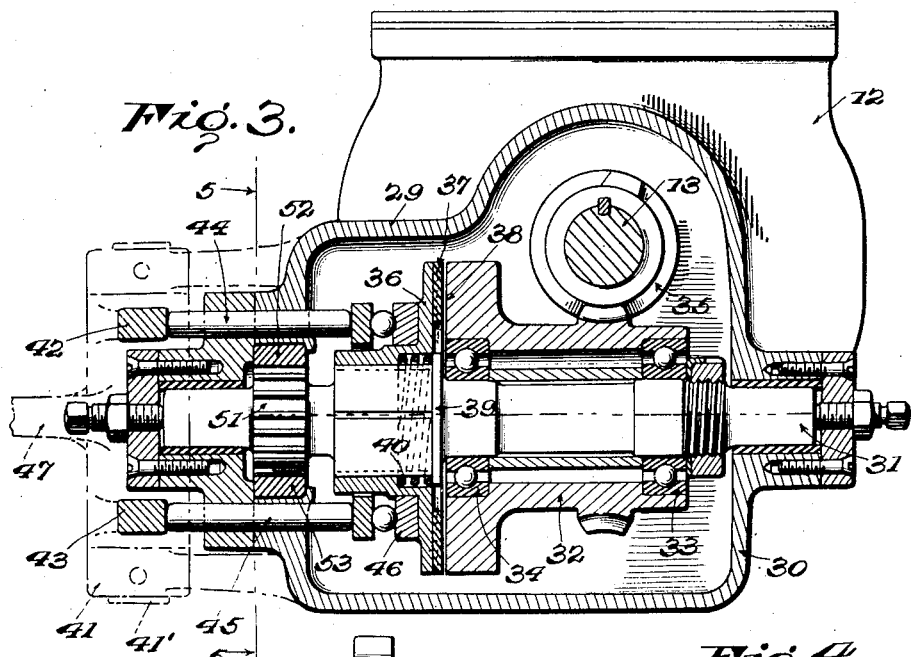
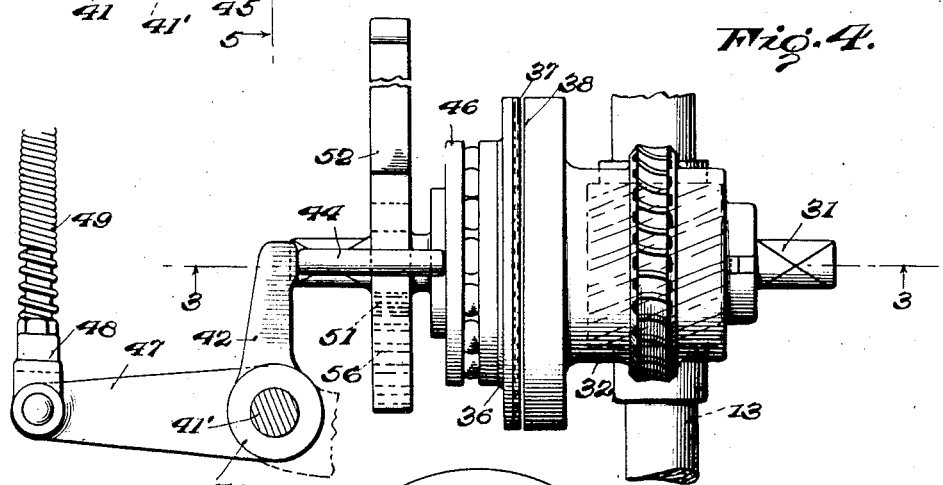
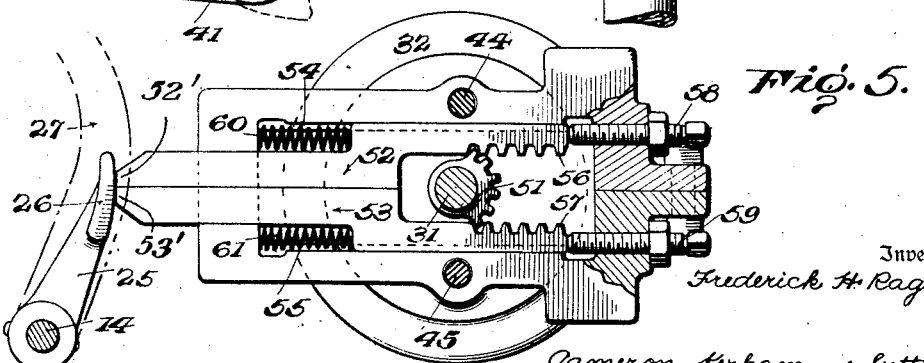
Inventor
Frederick H. Ragan
Cameron, Kirkam and Sutton.
Attorneys Patented Oct. 18, 1932

1,883,317

UNITED STATES PATENT OFFICE

FREDERICK HATHAWAY RAGAN, OF CLEVELAND, OHIO

BRAKE OPERATING MECHANISM

Application filed June 25, 1928. Serial No. 288,149.

This invention relates to brake operating mechanism, and more particularly to power brake operating mechanism in which power derived from the motion of the vehicle is used, under the control of the operator, to actuate the brakes.

Power brake operating mechanism heretofore known in the art has been subject to various disadvantages such as the lack of positive and accurate control by the operator, unresponsiveness to small variations in controlling pressures, and complication and expensiveness of structure. Furthermore, certain devices which have been proposed have been inefficient or inoperative to check rearward motion of the vehicle.

One object of the invention therefore is to provide a power brake operating mechanism which is at all times under the absolute control of the operator, which is positive and dependable in action, and which operates smoothly and with little effort on the part of the operator.

Another object is to provide such a device which will operate equally well whether the car is going forward or backward.

Another object of the invention is to provide such a device in which the friction of the parts is reduced to a minimum so that all variations in the controlling pressure will cause closely corresponding changes in the brake applying force.

Other objects and advantages will be apparent from the following description taken in connection with the disclosures in the accompanying drawings.

In the drawings,

Fig. 3 is a vertical section through the power unit taken approximately on the line 3—3 of Fig. 4;

Fig. 4 is a plan view of certain of the operating elements of the power unit, removed from their casing; and Fig. 5 is a vertical section taken approximately on the line 5—5 of Fig. 3.

Figure 1:
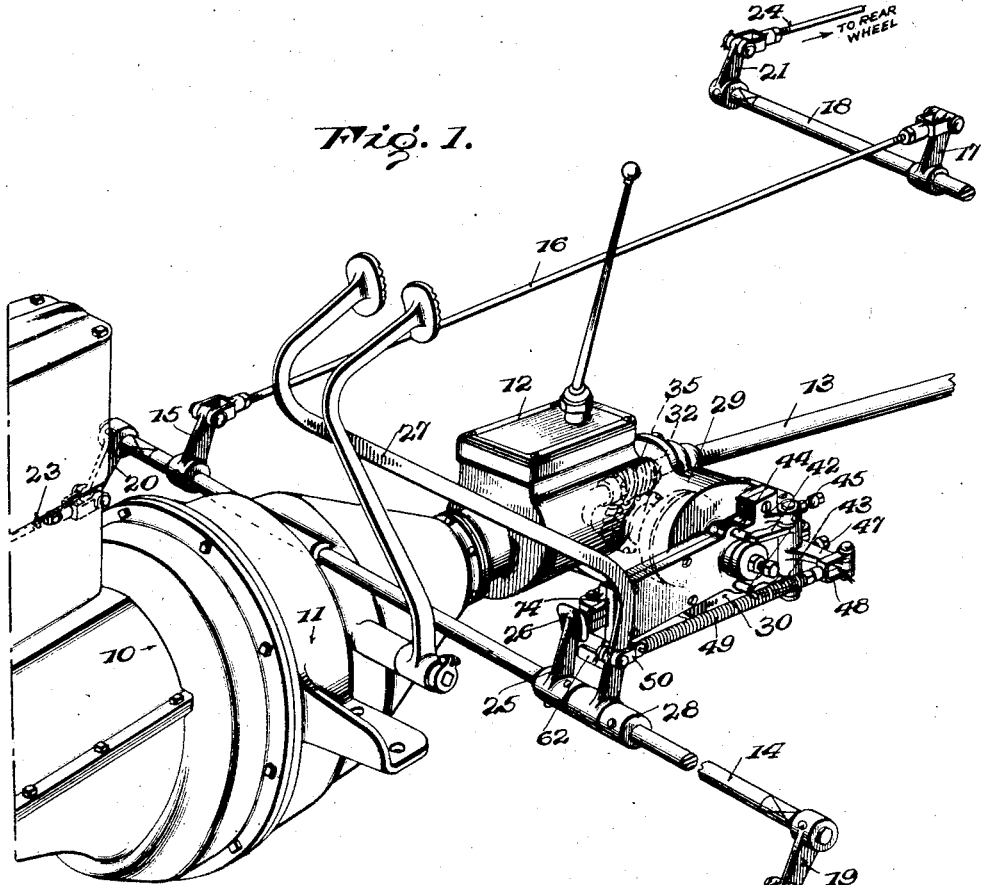
Fig. 1 is a perspective view of the device as applied to the transmission of a conventional type of automobile.
Figure 2:
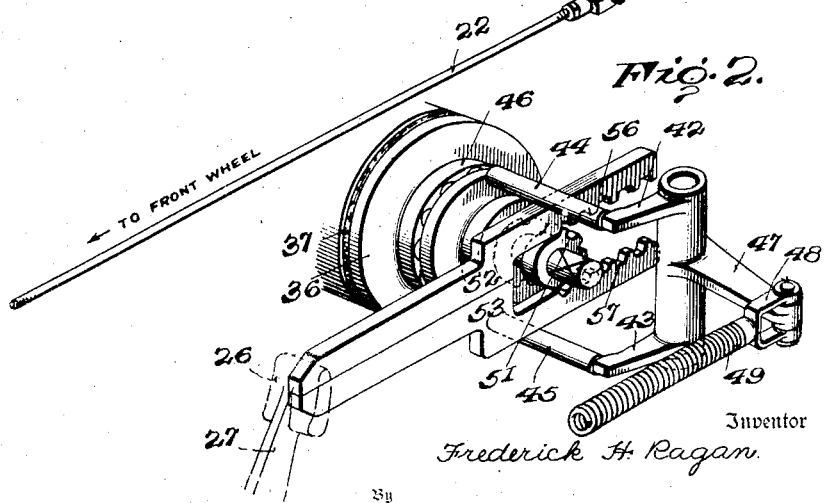
Fig. 2 is a perspective view of certain of the operating elements of the power unit, removed from their casing.

Referring to the drawings, numeral 10 indicates generally an internal combustion engine having a flywheel and clutch housing 11, which is operatively connected to a transmission housing 12. A drive shaft 13 extends rearwardly from the transmission housing 12, and is adapted to be driven by the transmission gearing therein from the internal combustion engine and to drive the rear wheels of the vehicle in the conventional manner.

A cross shaft 14 is mounted above the clutch housing in bearings near its ends in the vehicle frame (not shown) and is connected by means of arms 15, links 16, and arms 17 to a second cross shaft 18 which is also journaled in the vehicle frame rearwardly thereof. Cross shafts 14 and 18 are suitably connected to the brake mechanism of the front and rear vehicle wheels respectively as by means of arms 19, 20 and 21, and links 22, 23 and 24.

The structure so far described is conventional in character, but instead of the usual foot brake pedal attached to the cross shaft 14 to operate the brakes, there is provided an operating arm 25 fixed to the cross shaft 14 in any suitable way, and provided with an abutment member 26 at the upper end thereof. A foot pedal 27 is loosely journaled on the cross shaft 14 adjacent the operating arm 25, and is retained in its position on the shaft by any suitable means such as a set collar 28 fixed to the cross shaft 14.

The transmission housing 12 is provided either integrally therewith or suitably attached thereto, with an offset portion 29 (Fig. 3) having a complementary casing part 30 suitably attached thereto and forming therewith a laterally extending housing for the power brake operating mechanism. A cross shaft 31 is journaled at its ends in the walls of said housing and carries a power member in the form of a worm wheel and clutch member 32 rotatably mounted on an intermediate portion thereof by any suitable means such as the antifriction bearings 33 and 34. The drive shaft 13, where it passes through the offset portion 29, carries a driving worm 35 suitably keyed thereon, which is constantly in mesh with the worm gear teeth on power member 32 and causes said power member to rotate when the motor vehicle is in motion.

A sliding clutch member 36 is splined in any suitable manner on the cross shaft 31 and is provided with a friction facing 37 which is adapted to be brought into contact with the friction surface 38 of power member 32. A shoulder 39 is formed on cross shaft 31 between the clutch members 36 and 32, and a compression spring 40 is located in an enlargement of the bore of the clutch member 36 and bears against the shoulder 39 in order normally to retain the clutch surfaces out of contact. A bell crank lever 41 (Fig. 4) is arranged to swing on a vertical pivot 41' suitably fixed to the outer end of the power unit housing, and has a pair of forwardly extending arms 42 and 43 adapted to cooperate with thrust pins 44 and 45 which extend through the outer end of the housing, and are slidably mounted in apertures therein. The inner ends of the thrust pins 44 and 45 are adapted to abut against an antifriction thrust bearing 46 which is suitably mounted upon the sliding clutch member 36 and is adapted to transmit the thrust of the pins 44 and 45 to the sliding clutch member to cause its engagement with the clutch surface 38. Bell crank lever 41 is also provided with a laterally extending arm 47, the outer end of which is linked to the brake pedal 27 by a suitable operating connection such as the yoke 48, tension spring 49, and yoke 50 (Fig. 1). It will thus be seen that pressure upon the foot pedal 27 will cause the bell crank lever to apply pressure to the thrust pins 44 and 45 which will in turn cause frictional engagement between the surfaces 37 and 38.

Cross shaft 31 is also provided with a driving member in the form of a segmental pinion 51 formed integrally therewith or suitably fixed thereto, and a pair of driven rack members 52 and 53 are slidably mounted in suitable guides 54 and 55 in a lateral extension 74 of the power housing, above and below the cross shaft 31 and in the plane of rotation of the segmental pinion 51. Driven members 52 and 53 are provided with rack teeth 56 and 57, respectively, which are adapted to engage with the teeth of the segmental pinion 51, and at their opposite ends the driven members extend forwardly from the power housing and terminate in abutments 52' and 53' adapted to engage and actuate the thrust member 26 on the operating arm 25 for the cross shaft 14. Adjustable abutments 58 and 59 are provided to determine the normal retracted position of the driven members 52 and 53, respectively, and suitable means such as springs 60 and 61 are provided for maintaining the driven members in retracted position except when they are being operated by the segmental pinion 51.

A thrust block 62 (Fig. 1) is attached to the side of the foot pedal 27 in a position to engage the thrust member 26 on the operating arm 25 but normally spaced rearwardly therefrom. The tension spring 49 is wound with considerable initial tension so that it preferably acts normally as an inextensible link between the foot pedal 27 and the bell crank lever 41. However, if the power brake mechanism should fail to operate for any reason, or if it be desired to apply the brakes when the vehicle is not in motion, the spring 49 is adapted to yield and allow the thrust block 62 to engage the thrust member 26 and cause the foot pedal 27 to operate the brakes directly in the usual manner.

The operation of the power brake mechanism is as follows: When the vehicle is in motion, the rotation of drive shaft 13 causes the continuous rotation of the power member 32 in one direction or the other depending upon the direction of motion of the vehicle. If it be desired to apply the brakes, the operator will press on the brake pedal 27, and the pressure will be transmitted through the spring 49, bell crank lever 41, thrust pins 44 and 45, and thrust bearing 46 to the sliding clutch member 36, causing the engagement of the friction surfaces 37 and 38 with a pressure corresponding to the pressure exerted by the operator on the brake pedal 27. This frictional engagement will cause a proportionate rotary force to be transmitted from the power member 32 to the sliding clutch member 36, and through the shaft 31 to the segmental driving pinion 51 which, as will be clear by reference to Fig. 5, will cause one or the other of the driven members 52 or 53 to be projected outwardly from the power housing and to exert a brake applying thrust on the operating arm 25. It will be noted that although the thrust so exerted is derived entirely from the motion of the vehicle, that the amount of such thrust is controlled by the pressure of the operator on the foot pedal 27, and that this thrust is roughly proportional to such pressure.

It is important to note that, by reason of the direct driving connection between the cross shaft 31 and the driven members 52 and 53, there is very little internal friction in the operating mechanism and therefore the device is exceptionally responsive to small variations in pressure upon the foot pedal 27. For example, if the brake should initially be applied in too forcible a manner, a slight release of the pressure upon the foot pedal will effect a corresponding lessening of the brake applying force, without any appreciable lag caused by friction of the operating parts.

It will be noted that although this invention has been illustrated in conjunction with a four-wheel braking system, it is equally applicable to other pedal operated braking systems by suitably connecting the power operating device to the pedal shaft as herein shown and described.

Although but one embodiment of the invention has been shown and described in detail, it is to be expressly understood that the illustrated embodiment is not exclusive, and various other embodiments will now suggest themselves to those skilled in the art, while changes may be made in the construction, arrangement and proportions of parts, and certain features used without other features, without departing from the spirit of the invention. Reference is therefore to be had to the claims hereto appended for a definition of the limits of the invention.

What is claimed is:

1. In a power brake operating mechanism for motor vehicles, a driving member adapted to be rotated from a rotatable part of the vehicle, a pair of members one of which is adapted to be moved longitudinally in one direction from its normal position by rotation of the driving member in one direction, and the other of which is adapted to be similarly moved by rotation of the driving member in the opposite direction, means continuously under the control of the operator for regulating the rotation of said driving member, abutments preventing longitudinal movement of said members in the opposite direction from their normal positions, brake mechanism, and connections between the longitudinally movable members and the brake mechanism including abutments formed on said members whereby longitudinal movement thereof operates to apply the brakes.

2. In a brake operating mechanism for motor vehicles, a segmental driving pinion driven from a rotating part of the vehicle, a pair of racks adapted to be selectively engaged and moved by the segmental pinion in one direction from normal position dependent upon the direction of movement of the vehicle, means for retaining said racks in position to be engaged by said pinion, brake mechanism, and connections between said racks and brake mechanism whereby motion of the racks is caused to apply the brakes.

3. In a power brake operating mechanism for motor vehicles, a casing, a driving member journaled therein and adapted to be rotated from a rotating part of the vehicle, a pair of driven members mounted in said casing for longitudinal movement in one direction from a normal position, means for defining said normal position, one or the other of said members being adapted to be engaged and moved selectively by the driving member in accordance with the direction of rotation thereof, means continuously under the control of the operator for regulating the rotation of the driving member and connections whereby longitudinal movement of the moved member in said one direction is caused to apply the brakes.

4. In a power brake operating mechanism for motor vehicles, a driving member adapted to be rotated from a rotatable part of the vehicle, a pair of members one of which is adapted to be engaged by the driving member and moved longitudinally in one direction from its normal position by rotation of the driving member in one direction, and the other of which is adapted to be similarly engaged by the driving member and moved by rotation of the driving member in the opposite direction, means continuously under the control of the operator for regulating the rotation of the driving member, abutments preventing longitudinal movement of said pair of members in the opposite direction from their normal position, yielding means for retaining said longitudinally movable members in normal position, and connections between said members and the brake mechanism whereby longitudinal movement of said members operates to apply the brakes.

In testimony whereof I have signed this specification.

FREDERICK HATHAWAY RAGAN.